United States Patent [19]

Febbo

[11] 4,185,983
[45] Jan. 29, 1980

[54] METHOD AND APPARATUS FOR PROTECTING TONG-SUSPENDED GLASS SHEETS FROM BUFFETING

[75] Inventor: Anthony R. Febbo, Altoona, Pa.

[73] Assignee: PPG Industries, Inc., Pittsburgh, Pa.

[21] Appl. No.: 956,563

[22] Filed: Nov. 1, 1978

[51] Int. Cl.² ............................................. C03B 27/00
[52] U.S. Cl. ........................................ 65/104; 65/114; 65/173; 65/348
[58] Field of Search ................. 65/104, 114, 273, 348, 65/349, 350, 351

[56] References Cited

U.S. PATENT DOCUMENTS

| 2,251,159 | 7/1941 | Owen | 65/104 |
|---|---|---|---|
| 3,084,969 | 4/1963 | Davidson et al. | 294/118 |
| 3,178,045 | 4/1965 | Davidson, Jr. et al. | 214/89 |
| 3,333,934 | 8/1967 | Seymour | 65/32 |
| 3,341,313 | 9/1967 | Wheeler et al. | 65/104 |
| 3,367,764 | 2/1968 | Seymour | 65/291 |
| 3,406,022 | 10/1968 | Gehenot | 65/104 X |
| 3,849,100 | 11/1974 | Luppino | 65/348 |
| 3,881,906 | 5/1975 | Ritter, Jr. et al. | 65/104 |
| 3,930,831 | 1/1976 | McMaster et al. | 65/348 |
| 4,047,919 | 9/1977 | Oelke et al. | 65/273 |

Primary Examiner—Arthur D. Kellogg
Attorney, Agent, or Firm—Dennis G. Millman; Edward I. Mates

[57] ABSTRACT

This invention relates to a movable gate disposed between a fluid application station and a glass sheet transfer station of apparatus for processing heated glass sheets that are suspended or gripped by tongs along their upper edges during their conveyance along a first path of glass sheet travel for heating and further processing. The gate is moved to a retracted position to let a glass sheet leave the fluid application station and into an operative position to minimize swaying of the processed glass sheet when the latter is along said first path of glass sheet travel downstream of said fluid application station. This increases the chance of transferring the glass sheet in non-tilting relation to a peg conveyor located along a second path of glass sheet travel.

14 Claims, 3 Drawing Figures

METHOD AND APPARATUS FOR PROTECTING TONG-SUSPENDED GLASS SHEETS FROM BUFFETING

BACKGROUND OF THE INVENTION

The present invention relates to the thermal processing of glass sheets, and, particularly, to their processing while suspended from tongs for conveyance along a first path of glass sheet travel through a heating furnace, a fluid application station and into a transfer station where the glass sheets are transferred to a conveyor defining a second path of glass sheet travel. Mass production facilities for tempering glass sheets or shaping and tempering glass sheets require that the glass sheets be conveyed in a series through a tunnel-shaped heating furnace, be transferred one at a time to a shaping station, be shaped to a desired shape and transferred to a fluid application station where blasts of cold tempering medium such as cold air blasts are applied against the opposite surfaces of the shaped glass sheet. The conventional commercial operation involves processing one glass sheet at a time first at the shaping station and then at the fluid application station while a previous glass sheet in the series is suspended by tongs at a parking station beyond the fluid application station to enable the glass sheet to cool sufficiently before the tongs are relaxed to transfer the glass sheet to the conveyor defining the second path of glass sheet travel.

In a particular commercial arrangement, the second path of glass sheet travel comprises a so-called "peg-type" conveyor which transfers glass sheets in a direction transverse to the first path of glass sheet travel. Tong-supporting carriages carry tongs which grip the glass sheets during their movement along said first path of glass sheet travel through the heating furnace, the fluid application station and the parking station and into a glass sheet transfer station. At the latter station, the tongs are relaxed to release the glass sheet from gripping by tongs into a position along the second path of glass sheet travel where the lower ends of said released glass sheets rest on bumpers attached at one end to transverse slats interconnecting transversely spaced chain drives of a peg conveyor for supporting glass sheets between sets of pegs extending upward from said slats and spaced sufficiently from adjacent sets of pegs to form spaces to permit a glass sheet released from tong gripping relation to drop between adjacent sets of pegs of the peg conveyor.

Unfortunately, when a glass sheet is suspended from tongs at the parking station awaiting entry into the transfer station, it tends to sway because of fluid applied against the opposite surfaces of curved glass sheets supported by tongs at the fluid application station. When the glass sheet is transferred from the parking station to a position over a space between adjacent sets of pegs extending upwardly from the peg conveyor slats and bumpers, occassionally a glass sheet would not deposit properly onto the slats or would sway away from a freely hung position. This swaying causes the leading edge of a swaying glass sheet to collide with one or the other of the upstream pegs of the adjacent sets of pegs instead of dropping into the space between adjacent sets of pegs when the tongs are relaxed. Such a collision sometimes causes the glass sheet to fall on the floor of the plant and provide a problem of glass sheet removal instead of transferring the processed glass sheet onto the second path of glass sheet travel. Falls of this nature sometimes result in breakage of a processed glass sheet which represents a considerable investment in materials, labor and time of use for expensive equipment.

In the past, sliding doors had been provided at the exit of the furnace to protect the furnace from heat loss and the glass sheets within the furnace from premature cooling due to flow of cold fluid from the fluid application station through a shaping station, if present, and into the exit end of the furnace, or directly from the fluid application station into the furnace through its exit in case the apparatus was designed for treating flat glass sheets without shaping. Also, moving gates have been provided between the shaping station and the fluid application station in so-called vertical press bending and tempering apparatus wherein the gates protect the downstream portion of the shaping station from differential cooling due to deflection in an upstream direction toward the shaping station of cold tempering medium blasted against the shaped glass sheets. The presence of these gates in the positions normally occupied in prior art apparatus did not prevent the swaying of glass sheets suspended by tongs in positions along said first path of glass sheet travel located downstream of the fluid application station. Hence, glass sheets were frequently lost at the transfer station where the processed glass sheet was released from tong gripping in an attempt to transfer said sheet onto said peg conveyor between adjacent sets of upwardly extending pegs.

DESCRIPTION OF THE PRIOR ART

U.S. Pat. No. 3,178,045 to Charles R. Davidson, Jr. and William P. Mitchell discloses in FIGS. 12 and 13 a peg conveyor defining a second path of glass sheet travel onto which tong-gripped glass sheets are transferred automatically after the tongs have gripped the glass sheets during their conveyance along a first path of glass sheet travel through a furnace, and a cooling station. No provision is made to control swaying of the glass sheet when it is released from the tongs for deposit onto the peg conveyor.

U.S. Pat. No. 3,333,934 to Samuel L. Seymour discloses the use of an exit door 14 between the exit of a furnace and a glass sheet shaping station. The exit door is opened only to allow a glass sheet to leave the furnace en route to the shaping station and is closed at all other times to avoid loss of heat in the furnace near the furnace exit.

U.S. Pat. No. 3,881,906 to George F. Ritter, Jr., Frank J. Hymore, and Donald D. Rahrig and U.S. Pat. No. 4,047,919 to Waldemar W. Oelke and Floyd T. Hagedorn both disclose movable gates between a shaping station and a cooling station. The object of the movable gates is to prevent excessive flow of air from the cooling station into the downstream portion of the shaping station. In the latter patents, glass sheets are supported on roller conveyors where the problem of swaying does not exist.

SUMMARY OF THE INVENTION

The present invention relates to means to minimize swaying of the glass sheet along the first path of glass sheet travel after the glass sheet leaves a fluid imparting station (which may be a cooling station of a tempering apparatus or a coating application station of a coating apparatus) and an unloading station where the glass sheet is removed from tong-gripping support and transferred to a position between adjacent sets of pegs of a peg conveyor which provides a second path of glass sheet travel to an inspection and packaging station.

The benefits of the present invention will be understood more clearly in the light of a description of an illustrative embodiment that follows.

BRIEF DESCRIPTION OF THE DRAWINGS

In the drawings that form part of the description of the illustrative embodiment and wherein like reference numbers refer to like structural elements.

DESCRIPTION OF THE PREFERRED EMBODIMENT

Figure 1:
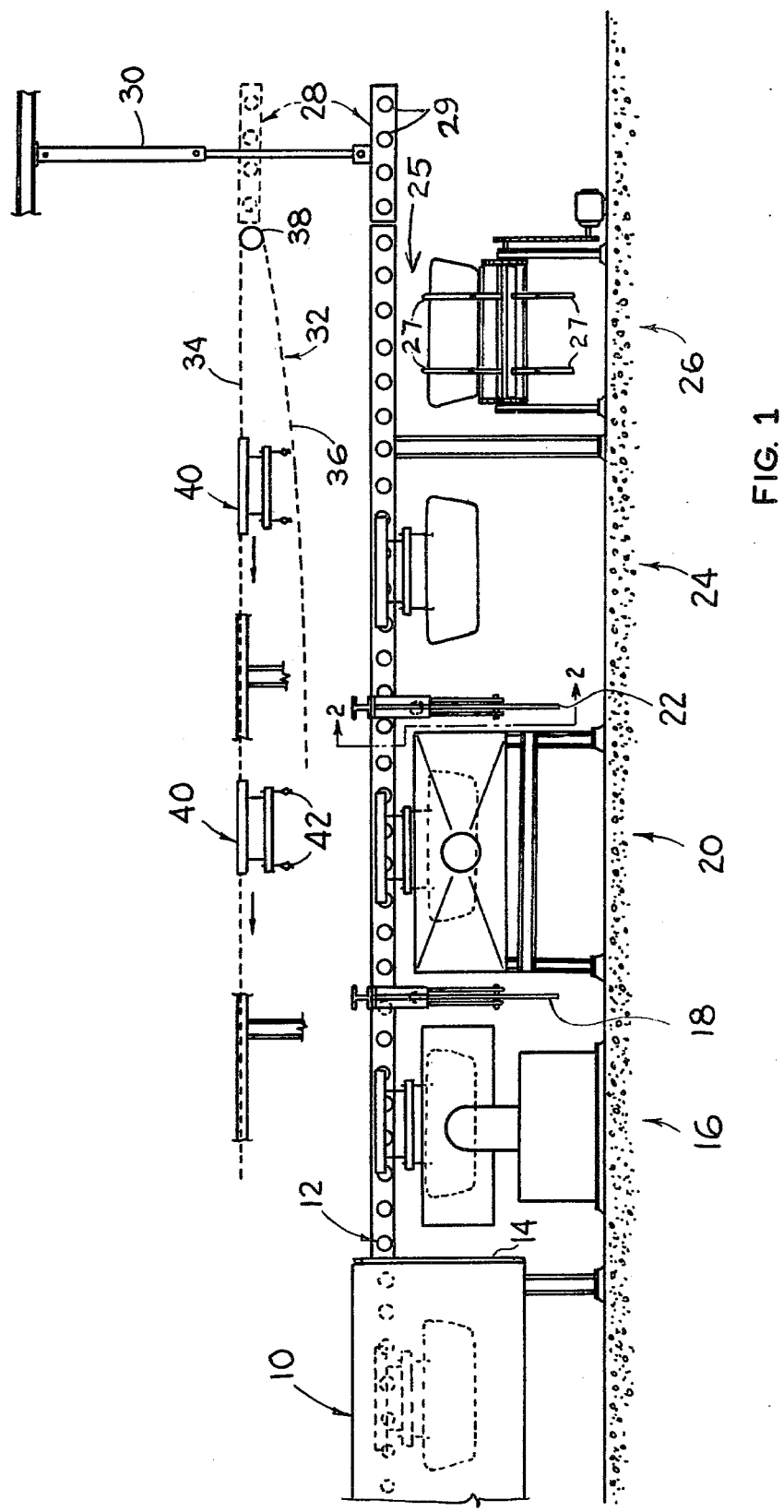
FIG. 1 is a longitudinal side view of a portion of a glass sheet shaping and tempering apparatus that incorporates the present invention, with certain parts omitted to show the present invention more clearly.

A preferred embodiment of the present invention comprises a tunnel-type furnace 10, the exit portion of which is shown. A forward conveyor comprising stub rolls 12 extends in a generally horizontal path from its upstream portion to the left of FIG. 1 to the right-hand end thereof, and extends through the furnace 10, an exit door 14 for the furnace, a glass sheet shaping station 16, a first gate 18, a fluid application station 20, a second gate 22 beyond the fluid application station 20, a parking station 24, and a glass sheet transfer station 25 immediately above one transverse end of a peg conveyor 26. The latter is provided with sets of pegs 27 arranged in closely spaced sets along the extent of the peg conveyor.

A transfer conveyor section 28 containing a plurality of stub rolls 29 (similar to stub rolls 12) is operatively connected to lifting and lowering means 30 for movement between a lowered position depicted in solid lines in alignment beyond the downstream end of the forward conveyor and an upper position depicted in phantom immediately above the position depicted in solid lines in FIG. 1. A return conveyor drive chain 32 is located above the forward conveyor. The drive chain 32 has an upper run 34 in horizontal alignment with the upper position occupied by the transfer conveyor section 28 depicted in phantom. The return conveyor drive chain 32 also includes a return run 36. The return conveyor drive chain is driven by a drive sprocket 38 at the downstream end of the chain. For the purpose of this description, the terms "upstream" and "downstream" are recited with reference to a first path of glass sheet travel defined by the stub rolls 12 of the forward conveyor.

The chain 32 is supported by a chain guide housing for the upper run 34 which ensures that the upper run is supported along a horizontal path. The chain is provided with longitudinally spaced lugs (not shown) adapted to engage the superstructure of tong support carriages 40 in a manner well known in the art. A carriage 40 is provided for each lug. In addition, several carriages are spaced along the length of the forward conveyor when the apparatus is operating.

The return conveyor drive chain 32 is arranged so that its upper run 34 moves from right to left in the view depicted in FIG. 1. An idler sprocket (not shown) similar to drive sprocket 38 is supported upstream of the entrance to the furnace 10 and elevator mechanism similar to the lifting and lowering means 30 and a transfer conveyor section similar to the transfer conveyor section 28 is disposed upstream of the entrance to the furnace 10 so that the additional transfer conveyor section moves into an upper position immediately upstream in alignment with the upstream end of upper run 34 and a lower position immediately upstream of the upstream end of the forward conveyor comprising the stub rolls 12. Each of the transfer conveyor sections 28 is identical to the other.

The shaping station 16 is preferably of the type depicted in U.S. Pat. No. 3,367,764 to Samuel L. Seymour. The fluid application station 20 is preferably of the type depicted in U.S. Pat. No. 3,849,100 to Antonio Luppino. The details of construction and method of operation of these patented devices can be obtained from the aforesaid patents.

The shaping station 16 of the illustrative apparatus embodiment comprises a pair of shaping molds having facing shaping surfaces of complementary curvature adapted to move between recessed positions at opposite sides of said first path of glass sheet travel and glass engaging positions to impress the shape of their shaping surfaces onto a hot glass sheet positioned therebetween. The fluid application station 20 of the illustrative embodiment comprises opposed nozzle boxes movable in unison relative to the opposite major surfaces of a hot glass sheet located therebetween to impose a temper in the glass sheet.

The conveyor is divided into sections, each operated individually to provide a program of glass sheet movement along said first path of glass sheet travel in a manner well known in the art. See U.S. Pat. No. 3,178,045 for details.

Figure 2:
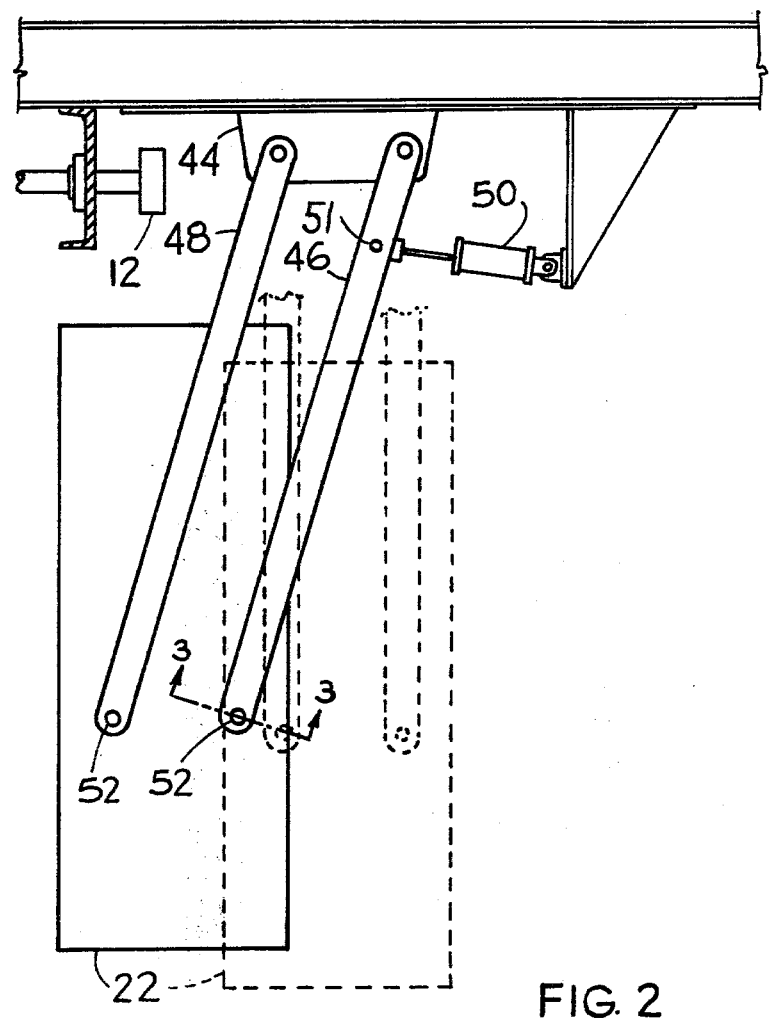
FIG. 2 is a sectional view taken along the lines 2—2 of FIG. 1 showing a movable gate in solid lines in an operative position to shield a processed glass sheet from blasts of fluid from a fluid application station that cause a tong-supported glass sheet to sway into possible misalignment with its desired positioning during transfer to the peg conveyor in solid lines, and showing the movable gate in a recessed position to permit the passage of the glass sheet along a first path of glass sheet travel in phantom.
Figure 3:
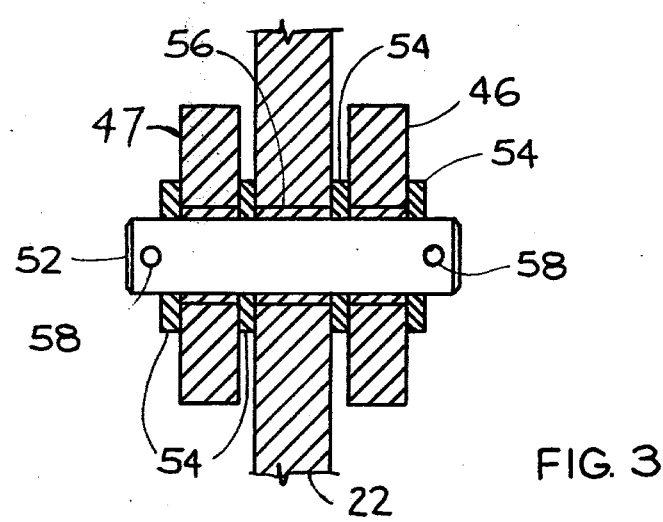
FIG. 3 is an enlarged, detailed sectional view taken along the lines 3—3 of FIG. 2 showing further details of the construction of the actuating means for the movable gate depicted in FIG. 2.

The means for actuating the gate 22 are disclosed in detail in FIGS. 2 and 3. An overhead support plate 44 is provided to support a pair of double links 46 and 47, which are pivoted at their upper ends to the overhead support plate 44. In addition, a pair of idler links 48 (only one of which is seen) is also pivotally supported at their upper ends to overhead support plate 44. A pivotally supported piston 50 is pivotally connected at the end of its piston rod to a pivot pin 51 that also interconnects the links 46 and 47 near their upper ends.

The links 46, 47 and 48 are pivotally connected at their lower ends to the gate 22 and, in order to facilitate pivoting of the gate 22, washers 54 are provided against the opposite major surfaces of the links and sleeve bearings 56 are provided around each of the pivot pins 52. To ensure that the links remain properly connected in pivotal relation to the gate 22, cotter pins 58 are provided through diametrically extending apertures near the opposite longitudinal extremities of each of the pivot pins 52.

It will be seen that the pivotally supported piston 50 is in position to actuate movement of the gate 22 into the solid line position across the first path of glass sheet travel, as depicted in FIG. 2, wherein it shields a glass sheet gripped by tongs at the parking station 24 from blasts of tempering medium while a subsequent glass sheet is being cooled by blasts of tempering medium applied at the fluid application station 20. Thus, when the cooling step of tempering is completed and the glass sheet in the fluid application station 20 is ready for transfer into the parking station 24, it is a simple matter to actuate piston 50 to retract the gate 22 from its operative position to an inoperative position where it provides clearance to enable the glass sheet to move from the fluid application station 20 to the parking station 24 (as depicted in the phantom lines of FIG. 2) while the glass sheet depicted as being supported in the parking station 24 simultaneously moves into position at the glass sheet transfer station 25 over the peg conveyor 26. The latter is indexed whenever a glass sheet is deposited thereon so that the sheet previous to the one now occupying the parking station has been moved down one position along the peg conveyor to provide a clear space for the present glass sheet to be dropped onto the peg conveyor.

A tong support carriage 40, provided with glass-gripping tongs 42 and means adapted for engagement by the longitudinally spaced lugs along drive chain 32, is loaded with one or more glass sheets at the entrance end of the furnace 10 by gripping the glass sheet or sheets with two or more glass-gripping tongs 42. Rotation of the stub rolls 12 in a forward direction causes the carriages 40 to move in a downstream direction through the furnace 10. When a glass sheet in a series of glass sheets reaches a position immediately upstream of the exit door 14, the latter is opened and the carriage 40 with its tongs gripping the glass sheet (or sheets) moves into position at the shaping station 16 between a pair of complementary press bending molds located on opposite sides of the first path of glass sheet travel defined by the forward conveyor comprising stub rolls 12.

After the press bending molds engage the glass sheet to impress their complementary shapes on the glass, the shaped glass sheet is moved into the fluid application station 20. Gate 18 located between the shaping station 16 and the fluid application station 20 is retracted to permit the carriage 40 with its tong-gripped glass sheet to move into the fluid application station 20. At the latter station, the glass sheet, still gripped by the tongs 42, is swept with opposing moving blasts of cold air that impinge against the opposite major surfaces of the glass sheet. The gate 18 is closed immediately after the trailing edge of the glass sheet moves past the position occupied by the gate 18.

Gate 22 located beyond the fluid application station 20 on the downstream end thereof, is also closed while the glass sheet is being subjected to the opposing blasts of tempering medium. A previous glass sheet shown in solid lines is disposed at the parking station 24 while a subsequent glass sheet is being shaped and cooled. When the glass sheet at the fluid application station 20 is ready to be removed, the immediately preceding glass sheet at the parking station 24 is transferred into position at the glass sheet transfer station 25 over a space between two adjacent sets of pegs at the upstream end of the peg conveyor 26. The gate 22 between the fluid application station 20 and the parking station 24 is opened to permit passage of the glass sheet that has just been cooled while the preceding glass sheet moves from the parking station into a position at the glass sheet transfer station 25 over the peg conveyor 26. The gate 22 is closed once more when the trailing edge of the cooled glass sheet clears the position occupied by the gate 22 in its operative position.

The present invention makes it possible for a glass sheet to remain with its major surfaces exposed in the vicinity of a fluid application station while a subsequent glass sheet is being processed at the fluid application station without introducing undue buffeting of the glass sheet. By this invention, the glass sheet can be cooled by radiant cooling for an additional period of time without introducing swaying that may cause the glass sheet to become misaligned with a space between adjacent sets of pegs of the peg conveyor when the glass sheet is transferred from gripping engagement by tongs to lower edge support by the peg conveyor at the glass sheet transfer station 25.

The gates 18 and 22 may be made of any material that is impervious to the tempering medium provided and is sufficiently light in weight to be moved rapidly between the operative position in which the cool tempering medium blasts are shielded from the parking station 24 and a recessed position to permit a passage of a processed glass sheet into the parking station 24 from the fluid application station 20. Suitable materials include thin sheets of aluminum and other lightweight metals or non-metallic materials such as thin refractory sheets of alumina-silica composition or other non-metallic inorganic fibrous-like materials such as reinforced plastics, polycarbonate or acrylic sheeting or glass sheets and the like.

A typical peg conveyor suitable for use in the illustrative apparatus is preferably of the type disclosed in FIGS. 12 and 13 of U.S. Pat. No. 3,178,045 to Charles R. Davidson, Jr. and William P. Mitchell, the description of which may be incorporated in the present application by reference. Provision may be made immediately above one end of the peg conveyor 26 to provide automatic tong unloading apparatus of the type covered by U.S. Pat. No. 3,084,969 to Charles R. Davidson, Jr. and William P. Mitchell, the disclosure of which may also be incorporated herein by reference. The details of the peg conveyor and of the automatic tong unloading device have been omitted from the description herein and from the specification in order to avoid providing extraneous descriptive material that would render the present specification vague and indefinite because of the incorporation of too much extraneous material. Suffice it to say that the glass sheets may be dislodged from the tongs manually as well as automatically when the glass sheets occupy a position in the glass sheet transfer station 25 above adjacent sets of pegs in the peg conveyor 26. The peg conveyor is provided with means for moving glass sheets transferred thereto in steps. The peg conveyor is moved one step after each glass sheet is deposited thereon to provide a space for the next glass sheet in the series.

While the specific embodiment of the present invention described hereinbefore relates to apparatus for shaping and tempering glass sheets, it is equally suitable for use between a cooling station and a parking station for apparatus designed to temper glass sheets without shaping the latter or for treating glass sheets in which a composition is applied against one or both major surfaces of the glass sheet at a fluid application station where the fluid applied is a gas or a liquid or a mixture or dispersion of liquids and gases or solids with either liquids and gases, which dispersion must be shielded from a parking station in order to avoid the buffeting of treated glass sheets. This latter alternate apparatus may include or exclude a shaping station prior to the fluid application. The composition applied may be one that forms a film on contact with heated glass and/or one that cause the hot glass sheet to develop a temper.

While the specific embodiment described in this specification includes a first path of glass sheet travel in which glass sheets are gripped by and suspended from moving tongs while they travel in an edgewise direction and a second path of glass sheet travel in which the glass sheets move in a broadside direction transverse to said first path of glass sheet travel while supported on their lower edges on a peg conveyor, it is understood that alternate embodiments within the gist of the present invention include any apparatus that handles glass sheets by supporting them by gripping from tongs while the glass sheets move either edgewise or broadside along a first path of glass sheet travel that includes passage through a fluid imparting station that induces swaying and then supports the glass sheets in a different manner, such as along their lower edge, while the glass sheets move either edgewise or broadside along a second path of glass sheet travel. The latter may extend longitudinally as well as transversely of said first path of glass sheet travel.

It is also understood that conventional sensing and control means well known in the glass sheet handling art, similar to the controls disclosed in U.S. Pat. No. 3,178,045 to Charles R. Davidson, Jr. and William P. Mitchell, may be used to coordinate the operation of the various moving parts of the illustrative embodiment of this invention.

The form of the invention shown and described in this disclosure represents an illustrative preferred embodiment thereof. It is understood that various changes in addition to those enumerated herein before may be made without departing from the gist of the invention as defined in the claimed subject matter which follows.

I claim:

1. In apparatus for processing a series of glass sheets suspended from tongs while conveyed along a first path of glass sheet travel extending in succession through a heating furnace and a fluid application station to a transfer station for transfer to a second path of glass sheet travel wherein each glass sheet is supported along its lower edge between pegs through an additional cooling area, the improvement comprising gate means located downstream of said fluid application station and upstream of said transfer station, and means operatively connected to said gate means to position said gate means in a first position across said first path and a second position clear of said first path, thereby permitting a glass sheet downstream of said fluid application station to be shielded by said gate means from fluid applied against a succeeding glass sheet in said series at said fluid application station, thereby permitting said glass sheet to cool without substantial swaying while gripped by tongs along said first path downstream of said fluid application station before it is transferred to said second path.

2. The improvement as in claim 1, wherein said gate means is operatively connected to pivoted link means, support structure for pivotally supporting said link means, and link movement actuating means supported by said support structure and operatively connected to said pivoted link means to move said gate means between said first position and said second position.

3. Apparatus for processing a series of glass sheets comprising a tunnel-type heating furnace, a fluid application station, and a glass sheet transfer station aligned along a first path of glass sheet travel disposed along an essentially horizontal direction, forward conveyor means for moving a series of glass sheets in a direction transverse to their thickness along said first path of glass sheet travel, a series of carriages constructed and arranged for movement along said conveyor, tongs carried by each of said carriages and adapted to engage the upper edge portion of a glass sheet to suspend the latter from said tongs for movement along said first path of glass sheet travel when said carriage moves along said conveyor means, gate means located in a plane intersecting said first path of glass sheet travel between the downstream end of said fluid application station and the upstream end of said glass sheet transfer station, and means operatively connected to said gate means to position said gate means in a first position across said first path and a second position clear of said first path, thereby permitting a glass sheet located along said first path downstream of said fluid application station to be shielded by said gate means from fluid applied against a succeeding glass sheet in said series, thereby permitting said glass sheet to cool without substantial swaying before it is transferred at said glass sheet transfer station to a second path of glass sheet travel.

4. Apparatus as in claim 3, wherein said fluid application station comprises a pair of nozzle boxes located on opposite transverse sides of said first path of glass sheet travel and constructed and arranged to apply tempering medium against the opposite major surfaces of a glass sheet suspended from tongs when said glass sheet occupies a position between said nozzle boxes.

5. Apparatus as in claim 3, wherein said fluid application station comprises means to dispense a film forming composition against a major surface of a glass sheet suspended from tongs in position facing said dispensing means.

6. Apparatus as in claim 3, further including a glass sheet shaping station between said furnace and said fluid application station, said glass sheet shaping station comprising a pair of shaping molds of complementary curvature located on opposite lateral sides of said first path of glass sheet travel and means to provide relative motion between said shaping molds between recessed positions to provide space for a glass sheet to enter said shaping station between said shaping molds prior to shaping and to leave said shaping station between said shaping molds after shaping and a glass sheet engaging position wherein said shaping molds engage the opposite major surfaces of said glass sheet therebetween to impress their complementary curvatures onto the glass sheet.

7. Apparatus as in claim 3, further including additional conveyor means for conveying said glass sheets from said glass sheet transfer station along a second path of glass sheet travel, said additional conveyor means providing means to support the transferred glass sheets on their lower edges for movement at an elevation below the elevation at which said glass sheets are supported for movement along said first path of travel.

8. Apparatus as in claim 7, wherein said additional conveyor means is constructed and arranged to move said glass sheets supported thereon in steps in a direction substantially parallel to their thickness.

9. Apparatus as in claim 3, further including a first movable transfer conveyor section disposed in end to end relation to said forward conveyor means at the upstream end of said forward conveyor means and a second movable transfer conveyor section disposed in end to end relation to said forward conveyor means at the downstream end of said forward conveyor means, reverse conveyor means located above said forward conveyor means, first lifting and lowering means operatively connected to said first movable transfer conveyor section for moving said first section between a lower position in horizontal alignment with said forward conveyor means and an upper position in horizontal alignment with said reverse conveyor means, and second lifting and lowering means operatively connected to said second movable transfer conveyor section for moving said second section between a lower position in horizontal alignment with said forward conveyor means and an upper position in horizontal alignment with said reverse conveyor means, whereby each carriage may be returned from the downstream end of said forward conveyor means to the upstream end of said forward conveyor means to enable said tongs to engage another glass sheet in said series.

10. A method of handling glass sheets comprising gripping each of a series of glass sheets with tongs near its upper edge, conveying said glass sheets along a first path of glass sheet travel through a hot atmosphere to heat said glass sheet to an elevated temperature sufficient for further processing, then subjecting said hot sheet to further processing by applying fluid at a fluid application station along said first path of glass sheet travel, removing said sheet from said fluid application station and finally disengaging said glass sheet from said tongs further downstream of said first path of glass sheet travel to deposit said processed glass sheet onto a second path of glass sheet travel, and shielding said processed glass sheet from fluid applied at said fluid application station when said glass sheet is downstream of said fluid application station along said first path of glass sheet travel, thereby minimizing swaying of said tong-gripped glass sheet after said further processing so that said glass sheet may be released from said tongs more accurately onto said second path of glass sheet travel.

11. The method of claim 10, further including shaping said glass sheet while gripped by said tongs after said conveyance through said hot atmosphere and prior to said further processing.

12. The method as in claim 10 or claim 11, wherein said shielding is accomplished by placing a gate across said first path of glass sheet travel immediately downstream of said fluid application station during a time beginning when said further processed glass sheet clears said fluid application station and ending after said further processed glass sheet is transferred to said second path of glass sheet travel.

13. The method as in claim 12, wherein cold tempering medium is applied against both major surfaces of said tong-gripped glass sheet at said fluid application station.

14. The method as in claim 13, wherein cold air is applied as said cold tempering medium.

* * * * *